United States Patent
Adams et al.

(10) Patent No.: US 7,248,678 B2
(45) Date of Patent: Jul. 24, 2007

(54) METHODS AND APPARATUS FOR ROUTING AND ACCOUNTING OF REVENUE GENERATING CALLS USING NATURAL LANGUAGE VOICE RECOGNITION

(75) Inventors: Jeffrey Nicholas Adams, Charlotte, NC (US); Sedelia Boudreaux, Charlotte, NC (US); Christopher D. Cordom, Herndon, VA (US); June Snyder Fusco, Lexington, SC (US); Robert Eric Grundmann, Charlotte, NC (US); Rodell Scott Sweet, Charlotte, NC (US)

(73) Assignee: Avaya Technology Corp., Basking Ridge, NJ (US)

( * ) Notice: Subject to any disclaimer, the term of this patent is extended or adjusted under 35 U.S.C. 154(b) by 683 days.

(21) Appl. No.: 10/360,897

(22) Filed: Feb. 7, 2003

(65) Prior Publication Data

US 2004/0156490 A1    Aug. 12, 2004

(51) Int. Cl.
   *H04M 1/64*    (2006.01)
   *H04M 11/00*   (2006.01)
   *H04M 15/00*   (2006.01)

(52) U.S. Cl. ............... 379/126; 379/88.01; 379/88.02; 379/88.27; 379/127.03

(58) Field of Classification Search ............ 379/88.01, 379/88.02, 88.05, 88.08, 88.18, 88.19, 88.23, 379/88.25, 88.27, 114.01, 121.03, 121.05, 379/126, 127.03

See application file for complete search history.

(56) References Cited

U.S. PATENT DOCUMENTS

| 5,646,839 | A  | * | 7/1997  | Katz .................... 379/142.11 |
| 5,943,406 | A  | * | 8/1999  | Leta et al. .................. 379/120 |
| 5,963,912 | A  | * | 10/1999 | Katz ............................ 705/7 |
| 6,044,138 | A  | * | 3/2000  | Graham et al. ......... 379/114.03 |
| 6,249,570 | B1 | * | 6/2001  | Glowny et al. .......... 379/88.22 |
| 6,373,939 | B1 | * | 4/2002  | Reese et al. ............. 379/266.1 |
| 6,625,267 | B1 | * | 9/2003  | Graham et al. ........ 379/114.03 |
| 6,728,345 | B2 | * | 4/2004  | Glowny et al. .......... 379/88.22 |
| 6,792,089 | B2 | * | 9/2004  | Tiliks et al. ................. 379/126 |
| 6,868,147 | B2 | * | 3/2005  | Wardin et al. ......... 349/112.01 |
| 6,885,734 | B1 | * | 4/2005  | Eberle et al. ............ 379/88.01 |
| 2003/0061039 | A1 | * | 3/2003  | Levin ........................ 704/246 |
| 2004/0243431 | A1 | * | 12/2004 | Katz ............................. 705/1 |

* cited by examiner

*Primary Examiner*—Binh K. Tieu

(57) ABSTRACT

Techniques and systems for routing and information collection for telephone calls are described. Upon initiation of a revenue generating call, a data management module creates a call interaction record, including a unique call identifier and information generated by an exchange originating the call. Call accounting information such as user identification and billing account information are collected from the user by presenting audible queries from the user and receiving voice responses. The voice responses are matched to stored information, which is stored in the call interaction record. If a voice response does not unambiguously identify the requested information, further queries may be presented to elicit more refined responses or request responses for recording and later playback. Routing information is then collected, again through audible queries and voice responses, and stored. Upon completion of the call, the call interaction record is closed and stored for later retrieval and analysis.

21 Claims, 4 Drawing Sheets

METHODS AND APPARATUS FOR ROUTING AND ACCOUNTING OF REVENUE GENERATING CALLS USING NATURAL LANGUAGE VOICE RECOGNITION

FIELD OF THE INVENTION

The present invention relates generally to improved techniques for routing and collection of data useful for billing, analyzing and accounting for revenue generating telephone calls, in order to route the calls properly and to collect and maintain billing, revenue and cost accounting information for the calls, thereby bringing increased revenue to an organization. More particularly, the invention relates to the use of natural language voice recognition to provide an interface for collection of relevant information about a call, such as the identity of the caller, identity of an account to which the time spent on the call and expenses incurred by the call are to be billed. Natural language voice recognition is advantageously employed to provide a convenient interface to the user for collection of the data.

BACKGROUND OF THE INVENTION

Many organizations, for example law firms and business consultants, realize substantial portions of their revenue through conversations with clients, in which a professional speaks with a client to gather information or to render advice. Many conversations are conducted by telephone, with the time a professional spends on the call being tracked so that the time can be billed to the appropriate client and task. In typical prior art systems, tracking of calls may be the responsibility of a telephone user, who makes manual time entries noting the duration of a call and the client account to which the call relates. Making such manual entries is inconvenient, and it is likely that calls will occur for which the time spent on the call will not be properly accounted for. If time spent on a call is properly accounted for and billed, the call contributes to revenue. Failure to collect billing and accounting data for a call diminishes revenue.

Various prior art systems for the tracking of calls employ greater or less degrees of automation in order to assist in accounting for the time spent on the calls. Such systems may simply display the duration of the call for the caller to aid manual entry of call data. Other systems allow the caller to enter a caller identification when making a call, as well as a billing account identifier. Such entries are typically made manually using a telephone keypad. Billing account identifiers may be relatively complex, for example consisting of two relatively long numbers, one identifying a client and a second identifying a particular project being conducted for the client. A number of deficiencies exist in such approaches. A caller may work on a number of different tasks during a single call, each task requiring the use of a different task identifier for proper billing. Many callers may find manual entry of task identifiers inconvenient, and thus may sometimes fail to enter correct billing information. In addition, many call tracking systems that require manual input of identification information do not provide any way to verify that the correct information has been entered. A nonexistent billing account number may therefore be entered, resulting in the expenditure of time and effort to correct the error. If the correct billing account number cannot be ascertained, the revenue for the call may be lost. Moreover, systems that track identifiers for outgoing calls do not typically track the data for incoming calls. There exists, therefore, a need for techniques for collecting needed data relating to revenue generating calls in ways that are convenient for a user and help to insure consistent and correct accounting for the calls.

SUMMARY OF THE INVENTION

A call system according to the present invention includes a central exchange capable of managing calls made by users employing a number of telephone sets connected to the central exchange, and an exchange control module to control the operation of the exchange. The call system also includes a routing module, a call analytics module and a natural language speech recognition module to allow a user to use natural speech to exchange routing and billing information with the system. The routing module uses a stored directory that can be updated with new information provided by a user, and the call analytics module collects user and billing information. The routing module, the call analytics module and the voice recognition module may operate under the control of a data management module that manages a call interaction record for each call and stores the collected information in the call interaction record. Call interaction records for completed calls are stored in a call interaction record database. Each record in the call interaction record database includes relevant call information such as a unique call identifier, identification of the originating user, identification of the account to which the call is to be billed, the destination of the call, the called party, and attributes of the call such as the start and end time of the call, the duration of the call, whether the call was local or long distance and other useful information for evaluating the cost of the call and the revenue realized from the call. The call interaction record database is accessible to a billing and analysis module, and records can be examined to determine the revenue generated by a call and groups of records can be sorted and analyzed in order to yield information about classes of calls and the cost, revenue generated by and profitability of various kinds of calls.

When a user initiates a call, a call interaction record including a unique call identifier is opened, in order to identify the call and to serve as a repository for data related to the call. The data management module then invokes the call analytics module to collect information, using the voice recognition module to present choices to the user and receive responses from the user. The choices are preferably presented in auditory form, and the user is allowed to provide spoken responses which are used to identify the user and the called party. The call analytics module collects user identification information and billing information and the data management module updates the call interaction record with the collected information. Next, the routing module is invoked to collect call destination information for the call, and then routing the call, with the voice recognition module being used to present queries to and receive voice responses from the user. After the call has been placed, the data management module updates the call interaction record with the identification of the called party and the call destination. The call analytics module then monitors the ongoing call and the call interaction record is updated with additional attributes of the call, such as the call duration, when the call is completed. Once the call has been completed, the call interaction record is closed and stored in the call interaction record database.

The call interaction record database is then used as desired to prepare billing records. The call interaction record database also serves as a source of information that can be used to evaluate revenue sources. For example, calls to a particular destination can be examined to determine the costs, revenue, and profitability associated with such calls, and calls from a particular user can be similarly examined. In addition, the various accounts to which calls can be billed may be classified by type of call. In a law firm, for example, calls may be identified as related to real estate, securities transactions, contract negotiations, and the like. The costs and revenue associated with each type of call may advantageously be automatically determined by searching for calls falling into various classifications and examining and analyzing the characteristics associated with the calls.

A more complete understanding of the present invention, as well as further features and advantages, will be apparent from the following Detailed Description and the accompanying drawings.

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art. By way of example, while a presently preferred embodiment of the invention as it might be applied in the context of a law firm is described, it will be recognized that the invention can be applied in any business in which services are provided over the telephone.

Figure 1:
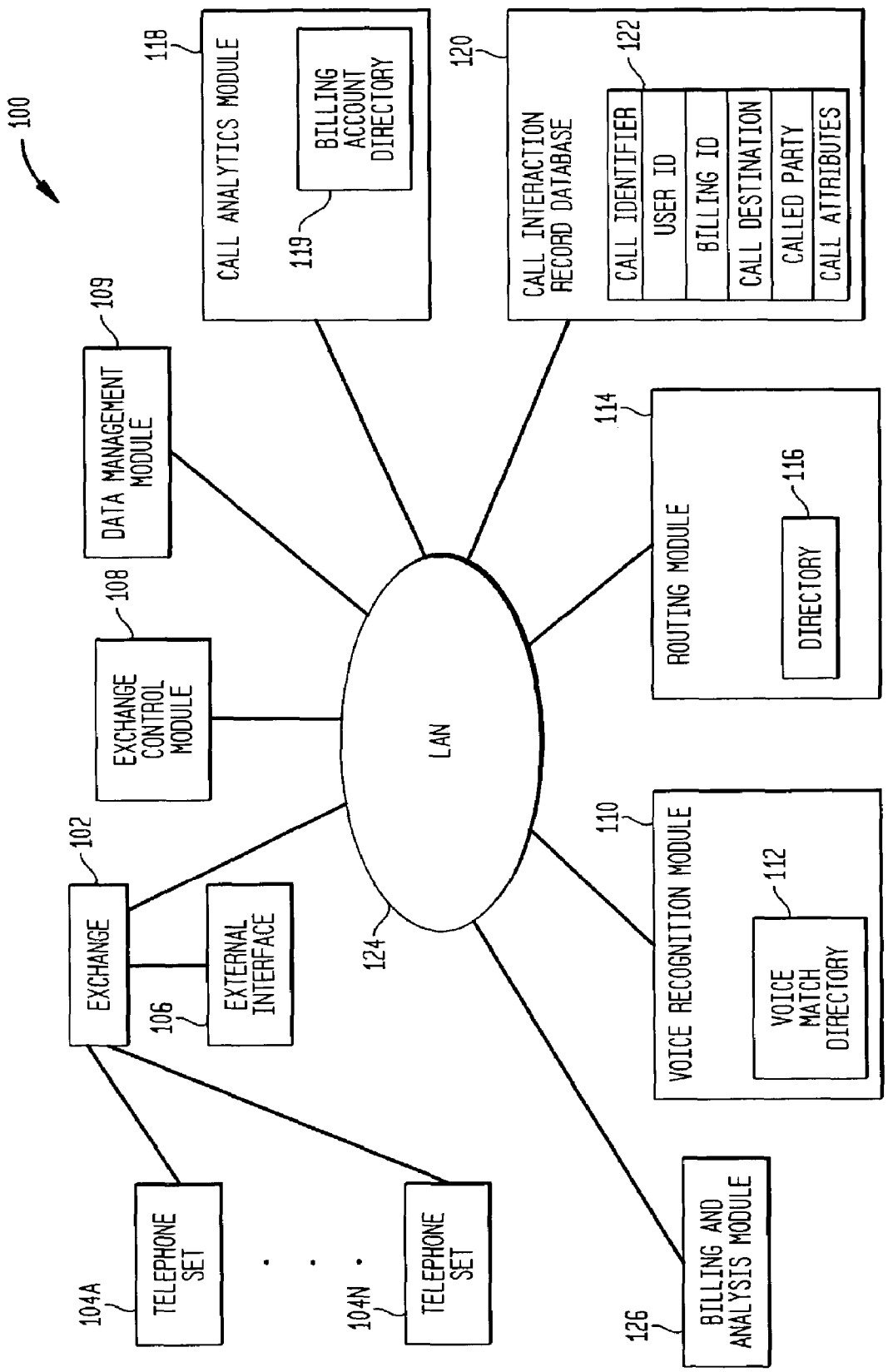
FIG. 1 illustrates a call system according to an aspect of the present invention.

FIG. 1 illustrates a call routing and tracking system 100 according to an aspect of the present invention. The system includes a central exchange 102, such as a PBX center, servicing a plurality of user telephone sets 104A . . . 104N. The user telephone sets 104 . . . 104N may have physical connections to the exchange 102. Preferably, the system 100 further includes an external interface 106, shown separately here for clarity but capable of being implemented as a feature of the exchange 102. The external interface 106 allows a user calling from an external telephone, such as his or her home phone or cellular phone, to gain access to the system 100 and take advantage of the natural language call routing and billing features provided by the system 100. The system 100 also includes an exchange control module 108, a data management module 109, a voice recognition module 110 employing a voice match directory 112, a routing module 114 employing a calling directory 116 and a call analytics module 118 employing a billing directory 119. The call analytics module 118 manages the collection of analytics for the call, that is, information to be used for billing the call and likely to be useful in revenue and cost analyses and other forms of analysis relating to the call.

The system 100 also includes a call interaction record database 120, storing a plurality of call interaction records such as the call interaction record 122. The various modules 108, 109, 110, 114 and 118, and the call interaction record database 120 are illustrated here as separate hardware elements communicating with one another and with the central exchange 102 through a local area network 124. It will be recognized, however, that the various modules can be implemented in different ways, for example as software modules hosted on one or more servers, or as elements of the central exchange 102. The various modules may be designed or programmed using any of a number of programming techniques known in the art. One particularly useful technique that may be employed is programming in a workflow based graphic user interface environment.

In addition, the various modules are illustrated here as communicating through the local area network 124, but it will be recognized that one or more modules may be in a remote location, communicating with the others through an external connection, such as a dedicated line or a wide area network connection, with the dedicated line or wide area network connection being connected to a local area network such as the network 124. In particular, it may be desired to locate the call interaction record database 120 in a secure remote location, or to mirror the call interaction record database 120 in a secure remote location, in order to guard against catastrophic data loss.

It will further be recognized that various sets of modules may be employed by the system 100, depending on which features are to be provided, and different sets of modules may be employed to provide similar functions, depending on the operating environment in which the system 100 is employed. For example, the exchange 102 is typically used to originate outgoing calls and to direct and correct incoming calls. However, some classes of incoming calls need not necessarily be directed through the exchange 102. If the system 100 is designed so that a call is answered by an automated response system, presenting queries and responses to and receiving voice inputs from a caller, incoming calls may be directly received at the voice recognition module 110. If such calls are to be routed to an extension, they may be passed to the exchange 102 by the voice recognition module 110, but in some cases a call does not need to be routed to an extension. Examples of such calls include calls requesting recorded information, such as movie schedule information, or self service interactions, such as automated appointment setups. Such calls might not be routed to the exchange 102 at all.

At the initiation of a call, the exchange control module 108 creates a call interaction record including a unique call identifier whenever a call is originated by the exchange. The call interaction record is passed to the data management module 109, which manages the information gathering in order to collect the necessary information for the call interaction record. If a call is not identified as a billable call, the data management module 109 does not collect information from the user in order to obtain accounting information relating to the call, although call cost information such as the per minute cost of the call may be automatically generated by the exchange 102 and the exchange control module 108, and then transferred to the data management module 109 for storage in the call interaction record.

For calls that are identified as billable calls, the data management module 109 stores the call interaction record in temporary storage and invokes the voice recognition module 110, the routing module 114 and the call analytics module 118 to collect information for storage in the call interaction record. Once the call has been concluded, the data management module 109 stores the call interaction record in the call interaction record database 120.

Suitably, a user originates a billable call by pressing an appropriate keypad number to originate the call. For example, the user may press "8" in order to originate an external billable call, as opposed to a "9" to originate an external nonbillable call. If the call is identified as nonbillable, the call interaction record may suitably be discarded, or may be stored in order to track telephone system usage, depending on the design of the system 100. However, for such calls the system 100 will not collect billing information for the call.

If the call is identified as a billable call, the exchange control module 108 generates a unique identifier for the call, as well as a designation that the call is a billable call, and transfers the call interaction record to the data management module 109. The data management module 109 then invokes the call analytics module 118, in order to collect user and billing information for the call, and simultaneously invokes the voice recognition module 110 in order to present audible queries to the user and receive and interpret any audible responses provided by the user. The voice recognition module 110 presents a natural language speech recognition interface to the user, allowing the user to communicate with the system 100 in a natural way.

The voice recognition module 110 may suitably present queries according to stored scripts, with a particular script being invoked in the circumstances calling for that script. For example, a script for the collection of billing information may involve the presentation of an initial query, with various alternative branches to be followed depending on the response. For example, if a request for billing information results in a general response, the next query may be a followup designed to obtain a more specific identification of the information collected, for example, a presentation of several identified candidates and a request that the user select the proper candidate.

Preferably, the voice recognition module 110 is able to identify unintelligible responses, and request that the user clarify such responses. At all times, the user is able to bypass the voice recognition module 110 by keying in responses using the telephone keypad. The module collecting the information, such as the call analytics module 118, recognizes the keying in of a response, overrides the voice recognition module and collects and stores the keypad entry.

At the initiation of an accountable call, the analytics module 118 is invoked, and the voice recognition module 110 is simultaneously invoked under the control of a script designed to collect a user identification. A query is presented to the user, requesting that the user key in an identification or speak his or her name. If the user speaks his or her name, the voice recognition module 110 receives and interprets the response, and may also authenticate the user by comparing the user's voice pattern with patterns in the stored voice match directory 112. If the voice pattern does not match, the call may be rejected or the user asked for additional authenticating information such as a password.

Once the user has been identified, the call analytics module 118 adds the user identification to the call interaction record and the voice recognition module 110 is invoked in order to ask the user for billing information. The user may enter an account number using a keypad or may, more typically, provide a voice response identifying the party or project to be billed. The user's response is converted to data, such as an account number, project description, or other form of project identifier, by the voice response module 110. The user response is then transferred to the data management module 109. The data management module 109 transfers the user response to the call analytics module 118, which searches the billing directory 119 for a matching account. Suitably, the billing directory 119 is indexed in various ways. For example, each account number preferably appears in the index. In addition, an identification of each client appears as an entry in the index, both as an identification of the client by name and by a client identification number. An account number for each project associated with a client also appears as a subentry associated with the client identification number. In this way, a user may identify a client, restricting the range of possible account numbers to those associated with the client. A followup query may then be presented to the user, allowing a selection from this restricted range of account numbers.

In addition, each user identifier may suitably be associated with the various accounts the user is working on, so as to provide an indication of which users are likely to be making calls relating to which accounts.

If more than one account is found matching the user's response, the user is asked for additional information to help specify the account, for example, by reciting the various accounts that have been found and asking the user to make a selection. For example, if five accounts match the response, the names of the accounts may be recited and the user may be asked to select a number 1-5, in order to select the correct account. If the user response does not match any accounts, or if the user response matches too many accounts, the user may be asked to record a description of the account, in order to enable an assistant reviewing the billing records to play the recorded description and enter the correct account number.

Once the account has been identified, or the account description recorded, the call interaction record is updated with the added information. The call routing module 114 is then invoked, along with the voice recognition module 110, with the voice recognition module 110 operating under the control of a call routing script in order to direct the call to the desired destination.

The voice recognition module 110 presents a query to the user, asking for the party or telephone number to be called. The user response is received, either through a keypad entry of a telephone number, or speaking of a name or telephone number. If a spoken response is received, the voice recognition module 110 translates the response and furnishes it to the call routing module 114. The call routing module 114 uses the response to look up the correct call destination in the directory 116, asking for clarification if the response is not understood or is ambiguous, or if no matching destination appears in the directory 1116. The call routing module 114 then directs the exchange control module 108 to make the call. The call routing module 114 also transfers the called party and call destination information to the data management module 109, which updates the call interaction record.

As the call progresses, the exchange control module 108 typically obtains call attribute information, such as the per minute cost of the call and the start time of the call, as well as any transfers of the call, for example from a central switchboard at the call destination to an extension within the call destination. As the new information is received, the exchange control module 108 transfers relevant information to the data management module 109, which adds the information to the call interaction record.

After the call has been completed, the exchange control module 108 transfers the end time and duration of the call to the data management module 109, which closes the call interaction record and stores it in the call interaction record database 120. The call interaction record, along with all other call interaction records in the call interaction record database, is then available for retrieval in order to prepare billing records and can also be retrieved and examined to identify sources of cost and expense.

As an example, suppose that a lawyer, Samuel Jones, wishes to make a billable call to a client representative, Bill Smith, at XYZ corporation. The XYZ corporation has a number of accounts at the firm employing Samuel Jones, and the purpose of the call is to discuss a contract negotiation for a contract between XYZ corporation and ABC corporation. Samuel Jones gains access to the system 100 by picking up a telephone handset and indicating that a billable call is to be made and therefore the call tracking features of the system 100 are to be used. In the present exemplary case, this is accomplished by dialing an "8" on the telephone keypad of one of the telephone sets 104A . . . 104N. If a user were calling from a line external to the system 100, he or she could dial a special telephone number in order to connect to the system 100 through the external interface 106. A caller connecting to the system 100 through the interface 106 would receive the same information collection services available to an internal caller, and the placing of the call would be indistinguishable from a placing of a call by an internal caller.

Samuel Jones's activation of the call tracking features of the system 100 would invoke the exchange control module 108, which would then in turn invoke the data management module 109. The exchange control module 108 creates a call interaction record including a call identifier and passes it to the data management module 109. The data management module 109 then invokes the call analytics module 118 in order to add information to the call interaction record for use in adding relevant information to the call, and also invokes the voice recognition module 110 in order to provide voice prompts to and receive voice responses from the user. Information that is typically collected from the user includes the user identification, the account to which the call is to be billed, the party called and the telephone number called.

In the present example, the voice recognition module 110 presents the initial query "please speak or key your user identification." The user, in this case Samuel Jones, speaks the name "Samuel Jones". This voice response is interpreted by the voice recognition module 110, which interprets the response and matches the response against a database of user identifiers. The voice recognition module 110 preferably is capable of recognizing relatively complex responses, such as responses that may be more elaborate than a simple recitation of a name. For example, if the law firm employing the system 100 employs two attorneys named "Samuel Jones," the user may respond "Samuel Jones in Corporate", in order to distinguish himself from another Samuel Jones working in the trust department. The voice recognition module 110 receives and interprets the complete response in order to correctly identify the user. If the response does not unambiguously identify the user, the voice recognition module 110 may present clarifying queries or may, if necessary, request that the user speak a numerical identifier. Preferably, the user always has the option to speak or key in a numerical identifier. If the user keys in a numerical identifier, the call analytics module 118 overrides the voice recognition module 110 and obtains the identifier from the keypad entry.

If the user has provided a spoken identification, the voice recognition module 110 may suitably provide authentication by comparing the user's voice against voice samples stored in the voice match directory 112. The voice response given to provide the user identification is compared against a stored voice pattern sample associated with the user. Authentication is preferably performed after the user's response has been matched against a user identification directory and the user identification corresponding to the response has been retrieved. The voice pattern associated with the user identification is compared against the voice pattern of the response, in order to verify that the user is in fact the user associated with the user identification provided. Such voice verification helps users to avoid the often inconvenient step of providing a password, and helps to prevent the user of passwords, which are often carelessly maintained. For example, if a password is required to be entered frequently, it may be taped to a telephone in order to avoid the requirement of looking it up. However, such a practice exposes the password to anyone passing the telephone.

In cases in which voice match authentication is not performed or is impossible given the quality of the voice connection, the user may suitably be asked for a password in order to authenticate the user. Such a design insures that the user will still be able to gain easy access to the telephone system if voice verification is difficult for some reason. However, if the user is not required to enter a password too frequently, it will be easier for users to maintain password security.

Once the user, in this case Samuel Jones, has been identified and the identification has been authenticated, the user identification is passed to the data management module 109, which adds the user identification to the call interaction record. The data management module 109 then directs the call analytics module 118 to collect information for the account to which the call is to be billed, also invoking the voice recognition module 110. The voice recognition module 110 operates under the control of an account information collection script.

The voice recognition module 110 presents a query such as "please speak or key the account to which the call is to be billed." In the present case, as noted above, the project to which the call is to be billed is the negotiation of the XYZ Corporation contract with ABC Corporation. The voice recognition module 110 will obtain a voice response from the user and interpret the response in order to identify the correct account. Billing information collected using the system 100 suitably identifies projects by account numbers. Each account number is associated with a project being performed for a client. The account numbers may suitably be in the form of client matter numbers, wherein each number has a client number and a project number. The client number identifies the client, and is the same in all account numbers associated with that client. The project number identifies a particular project. For example, the account number for the negotiation of the XYZ corporation contract with the ABC Corporation may suitably be the number "1001-2321", where the number "1001" is the client number and the number "2321" is the project number. Organizing account numbers in such a way makes it easy to identify the account numbers associated with a particular client, and to easily identify a restricted set of numbers by identifying the client. The user could speak or key the response "1001", or could speak the response "XYZ Corporation." Either of these responses would identify the subset of account numbers whose client number was "1001."

The user has a number of different choices, and may provide more or less elaborate responses. A more elaborate response will tend to define the correct account more unambiguously, while a less elaborate response may present ambiguity and require clarification. The voice response module 110 is able to use natural language voice recognition to interpret the voice response received, use it to search for the correct account and determine whether the account has been unambiguously identified. If the voice response module 110 determines that the account has not been unambiguously identified or that the response does not point to a known account, the voice response module 110 can request clarification or an alternative method of identifying the account.

In the present example, the user may respond by keying or speaking the account number, in which case the account has been unambiguously identified. However, the voice response module 110 can also interpret verbal responses. For example, if the user responds by saying "XYZ Corporation," "the client is XYZ Corporation" or a similar phrase, the voice response module 110 can interpret the spoken phrase in order to retrieve the client number, and the analytics module 118 can search a billing directory in order to retrieve all account numbers associated with that client. If relatively few account numbers were associated with the client, the voice response module 110 can present a clarifying question in the form of a list of possible matches. For example, if there are five different accounts involving the XYZ Corporation, the voice response module 110 might present a clarifying query such as "The following matches have been retrieved. Match 1-XYZ Corporation bond issue preparation. Match 2-XYZ Corporation copyright license negotiation. Match 3-XYZ Corporation contract negotiation with ABC Corporation. Match 4-XYZ Corporation employee handbook development. Match 5-XYZ Corporation trademark development. Please speak or key the number for the correct account." The user would say "three" or press the "3" key on the keypad. The account would be identified and the call interaction record would be updated.

If the initial user response did not match to any accounts, the voice response module 110 reports that no accounts were matched and presents a suitable query. For example, a query might be "I did not find any accounts matching your description. If you know the account number, please speak or say it. Otherwise, give a description of the account for me to record." If the user provides a numerical account number, that number is stored in the call interaction record. If the user gives a response that cannot be used to unambiguously identify the account, the response is recorded and stored in the call interaction record. The call interaction record can then be examined later, for example by administrative personnel, and the recorded information can be used to identify the account.

A similar procedure could be followed if the initial response matched with too many accounts to be presented in the form of a menu. For example, if the user responded "XYZ Corporation" and 100 accounts were associated with the XYZ Corporation, it would be inconvenient for the user to have to listen to a recitation of all 100 accounts. The user would likely wish to speak or key the project number, if known, or to record an account description, rather than select from an unwieldy menu.

If sufficient resources are devoted to training the voice recognition module 110, the voice recognition module 110 can interpret responses that are much more free-form than simply a recitation of a number or a selection from a menu after reciting the name of a client.

In the present example, suppose that the user responds "XYZ Corporation ABC contract negotiation." If the voice recognition module 110 were trained to do so, it could interpret such a response so as to unambiguously identify the account. The voice response module 110 would confirm the choice, suitably by repeating it in a more formal way, for example "I have located a match. The client is XYZ Corporation and the project is the contract negotiation between XYZ corporation and ABC Corporation. Is that correct?" Upon an affirmative response by the user, the voice recognition module 110 would provide the information for the identified account to the call analytics module 118, which would in turn transfer the information to the data management module 109 for updating of the call interaction record.

Alternatively, the user may provide a less detailed response, such as "XYZ Corporation contract negotiation." In such a case, the voice response module 110 might be designed so as to present a clarifying query. For example, if the ABC contract is one of a number of contract negotiations for the XYZ Corporation, the voice response module may present a question such as "which contract negotiation for XYZ?" If the user provided a response such as "ABC contract negotiation," the voice response module 110 would then be able to identify the account.

At all times during the billing information collection, the user may return to an earlier query by making an appropriate voice response or pressing an appropriate keypad key. For example, if the user's initial response does not match any account, the user may respond to the request to present information for recording by choosing to return to the previous query in order to present a new response that the user feels will be more effective.

Once the user identification and account information has been collected, the exchange controller 108 invokes the routing module 114 in order to collect the call destination information in order to place the call. In the present example, the user wishes to call Bill Smith at his mobile telephone. The routing module 114 presents a query script to the voice recognition module 110, and the voice recognition module 110 presents a query such as "Please speak the name of the party you wish to call or enter or speak the telephone number of the party." The user responds with "Bill Smith's mobile," and the voice recognition module 110 receives and interprets the response and passes the response to the routing server 114 for use in searching the directory 116. The routing module 114 prepares an appropriate response based on the results of the search, and the voice recognition module 110 presents the query. For example, if a match is found, the response might be "Bill Smith's mobile number has been found. Would you like me to contact him now?" Upon an affirmative response by the user, the routing server 114 would add the identification of the called party and call destination to the call interaction record and direct the exchange control module 108 to dial the appropriate number. If a match for "Bill Smith" is found, but no match for the mobile number is found, the response might be "Bill Smith's mobile number was not found. Would you like me to try his other number?" with appropriate action being taken in response to a user selection. Another possibility is that Bill Smith's number is not known, but he is at an extension with the company whose billing information has been submitted. In such a case, the routing module 114, upon failing to find an entry for "Bill Smith," might examine the account information in the call interaction record and search a billing directory in order to identify the company with which the account is associated. Once the company is identified, the routing module 114 looks up the central telephone number in the directory 116 and prepares a query such as "Bill Smith at XYZ corporation has not been found. Would you like to add an entry or dial the operator?" The user would then make an appropriate choice and provide the desired information. The voice recognition module 110 receives and interprets the information, asking clarifying questions as needed. The voice recognition module 110 passes the information to the routing server 114, which adds any new entries to the directory 116 and directs the exchange control module 108 to dial the desired number, if any.

If the call is dialed but the party does not answer, the routing module 114 updates the call interaction record with the duration of the attempt and the start and end time of the attempt and asks the user for further choices or guidance. The user may make additional attempts to complete the call, for example, by changing the destination at which the party is to be called or providing additional or alternative telephone numbers. In such a case, the routing module 114 makes new attempts to complete the call according to the instructions and updates the call interaction record with information relating to the new attempts. Once the call has been connected, the call analytics module 118 monitors the status of the call by receiving information from the exchange control module 108. Such information may include, for example, whether the call is long distance or local, the cost per minute of the call and the duration of the call. Once the call has been completed, the call analytics module 118 transfers data relating to the call to the data management module 109. The data management module 109 updates the call interaction record.

If desired, the system 100 may suitably be designed and programmed so as to give the user an opportunity to record an audible memorandum to be stored in the call interaction record. Suitably, the voice recognition module 110 presents the user with an appropriate voice prompt and captures the user response as a sound file. The sound file is transferred to the data management module 109 and stored in the call interaction record. After termination of the call, and collection and recording of any additional data such as the audible memorandum mentioned above, the data management module stores the call interaction record in the call interaction record database 120.

The previous discussion describes the operation of the system 100 in originating and routing an outgoing call and collecting data for the call. It is also possible to employ the system 100 to create a call interaction record for an incoming call and to allow the user the option of collecting accounting information for the call. If the system 100 is employed in this way, a call interaction record is created, including a unique call identifier and additional relevant information about the call, whenever a call is received and routed to a user. The call information may suitably include the start time of the call, the extension to which the call is directed, and the like. Once the call is concluded, the ending time of the call is stored in the call interaction record, and the data management module 109 invokes the call analytics module 118 to collect billing information. The call analytics module 118 invokes the voice recognition module 110, which presents a query asking the user if he or she desires to collect billing information for the call. If the user answers in the affirmative, user identification and billing information are collected in a way similar to that described above and stored in the call interaction record. The call interaction record is then stored in the call interaction record database 120. If the user answers in the negative, no billing information is collected from the user.

As an alternative to asking the user after the termination of every call if billing information is to be collected, the system may suitably be adapted to respond to a keypad entry or similar indication from the user, entered after the termination of a call. After termination of a call, the user may suitably press a switch hook on a telephone set and then press a designated keypad key, such as an "8". Such a keypad entry will invoke the data management module 109, allowing billing information to be collected.

As an alternative to collecting data for outgoing or incoming calls handled by a human user, the system 100 may also be employed to provide services to and collect billing data from a user employing automated services that could be billed to a caller. In such a case, an incoming call identified as a billable call would be directed to the exchange 102 or alternatively to the voice recognition module 110. The data management module 109 would invoke the call analytics module 118, which would use the voice recognition module 110 to collect the necessary billing data, and would then provide the services, by presenting queries or menus to the caller, receiving the caller responses and providing information or taking actions as indicated by the responses.

The call interaction records stored in the call interaction record database 120 are available for use by a billing and analysis module 126. The billing and analysis module 126 can sort through the call interaction records using whatever criteria is desired, in order to obtain billing information and to perform various analyses to determine the costs and profitability of various calls. Categories of calls to be examined may be, for example, calls billed to a particular account, calls originating from a particular user, or calls falling into a particular classification.

In addition, the call interaction records stored in the call interaction record database 120 may be used for any other purposes desired by an organization. A system such as the system 100 may easily be a part of or integrated with other data collection and analysis systems operated by an organization, and the data collected by a system such as the system 100 can be employed by these other system as desired. For example, the data provided by the call interaction record database 120 may provide insight into the relative popularity of various types of services, and analysis of such data may be useful in making decisions about marketing or resource allocation, for example. The collection of data in a manner convenient to the user helps to assure completeness of information in the call interaction record database, increasing the value of the information and its usefulness for whatever purposes are desired.

The voice recognition module 110 provides queries to the user and receives responses from the user in order to collect information needed by the call analytics module 118 and the routing module 114. The voice recognition module 110 operates using scripts designed to allow engagement with the user, and uses natural language processing to interpret user responses and match the user responses to data indicated by the responses or to take action based on the responses.

Figure 2:
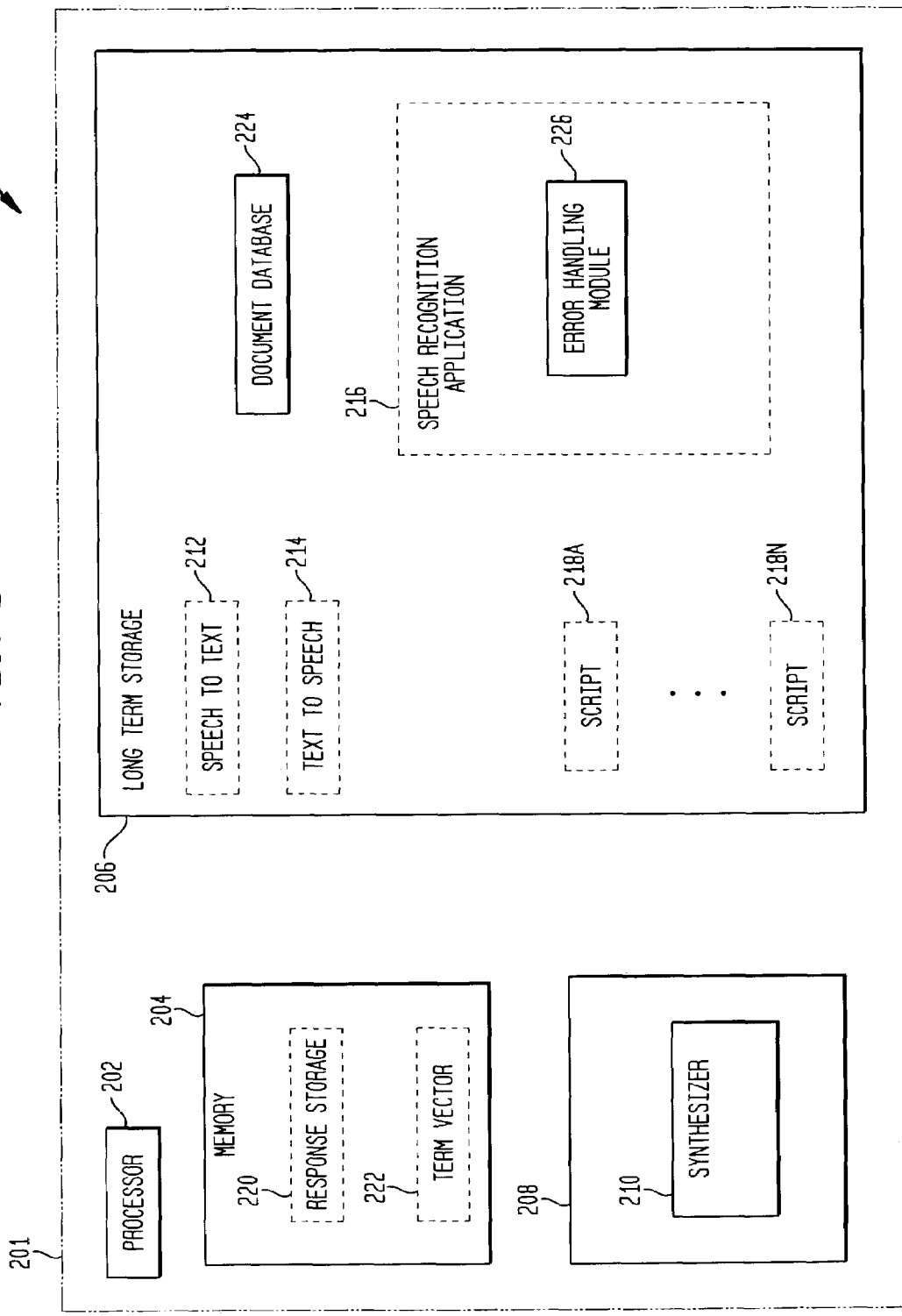
FIG. 2 illustrates a voice recognition module according to an aspect of the present invention.

FIG. 2 illustrates additional details of the voice recognition module 110. The voice recognition module 110 is suitably implemented as a computer 201 operating as a network server and includes a processor 202, short term memory 204 and long term storage 206. The voice recognition module 110 further includes a user interface 208 including a voice synthesizer 210 for generating queries and other voice data to be played to the user. The voice recognition module 110 need not include a loudspeaker or microphone, because the actual playing and receiving of sound will be accomplished by the exchange 108 and whichever of the telephone sets 104A . . . 104N or external telephone set is being employed by the user. Various data and programs reside on the voice recognition module 110, suitably stored in the long term storage 206 and copied to the memory 204 as needed for use or execution by the processor 202. These include the voice match directory 112, a speech to text converter 212, a text to speech converter 214 and a natural language speech recognition application 216. The voice recognition module 110 employs stored scripts 218A . . . 218N, which provide the queries and other voice information to be played to the user. This information is converted to speech by text to speech converter 214, and the speech synthesizer plays the information to the user. The user response is received, converted to text by the speech to text converter 212 and processed using the speech recognition application 216.

The user response may suitably be stored in a response storage area 220, suitably in the memory 204. Relevant terms are extracted to create a term vector, such as the term vector 222. The term vector is matched against documents stored in a document database 224. The documents comprising the document database are collections of terms associated with data or actions.

During a training phase, user responses are given and a trained operator enters data or directs actions as indicated by the responses. For example, the operator may route a call or enter a billing account identifier as indicated by a response. The speech recognition application 216 extracts terms from each response and stores the terms in a document associated with the data that was entered or the action taken. Then, during the operation phase, the term vector created from the user response is matched against the documents and the document in which the terms most frequently appear is matched to the term vector. The data or action associated with the document is tentatively matched to the response.

The speech recognition application 216 then preferably issues a confirmation query, presenting the selection that has been matched to the response and requesting that the user indicate whether the selection is correct or incorrect, with appropriate action being taken if the selection is incorrect. For example, the user may be presented with a refined or clarifying query or given an opportunity to present the response again or to respond in some other way, such as with a telephone keypad entry.

The speech recognition application 216 includes an error handling module 226, in order to provide direction if no intelligible user response is received for a query. For example, if a user does not respond in a prescribed time, the error handling module 226 may repeat the query.

Figure 3:
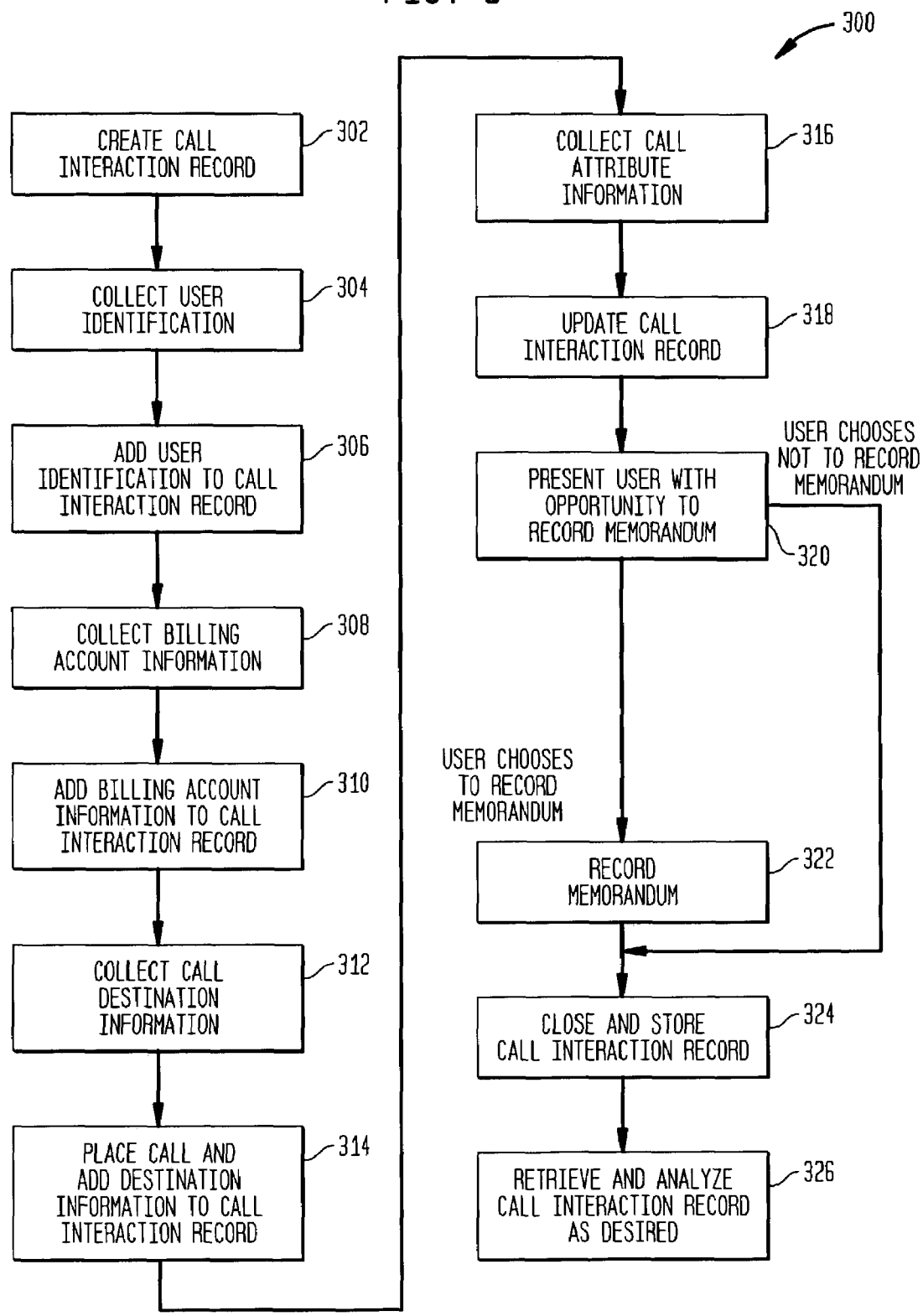
FIG. 3 illustrates process of call information collection according to an aspect of the present invention.

FIG. 3 illustrates the steps of a process 300 of call management and billing according to an aspect of the present invention. The process 300 may suitably be performed using a system similar to the system 100 of FIG. 1. At step 302, upon user initiation of a call for which billing information is to be collected, a call interaction record is created with a unique call identifier assigned to the call interaction record. Additional information relevant to the call is also added to the call interaction record. Such information suitably includes information such as the start time of the call and the origin of the call, such as the extension used if the call is internal, or the fact that the call originated externally and the originating telephone number, if this can be determined. At step 304, user identification information is collected from the user, suitably by presenting the user with a query requesting the information, receiving responses from the user that may include voice responses, direct data entries such as keypad entries or a combination of voice responses and direct data entries and matching the to a stored user identifier, using natural language speech recognition to interpret voice responses. At step 306, the user identification is added to the call interaction record. At step 308, billing account information is collected from the user, suitably by presenting the user with an appropriate query and using natural language speech recognition to interpret voice responses from the user, while also recognizing alternative responses such as keypad entries. The user responses are matched to a stored billing account identifier, or recorded for later use in determining the appropriate billing account.

At step 310, the collected billing account information is added to the call interaction record. At step 312, call destination information is collected from the user, suitably by presenting the user with an appropriate query and using natural language speech recognition to interpret voice responses from the user, while also recognizing alternative responses such as keypad entries. Depending on the response provided by the user, the response may be employed to look up a stored call destination in a directory, it may be used to dial a telephone number provided by the response, or it may be used to create a directory entry, with the user being provided with an option of dialing the telephone number in the new directory entry after creating the entry. At step 314, the call is placed and the call interaction record is updated with the call destination information. At step 316, during the call, information is collected about relevant attributes of the call, for example whether the call is local or long distance, the per minute cost of the call, and the like. At step 318, upon termination of the call, the call interaction record is updated with the end time of the call, the duration of the call and the cost of the call, as well as other collected call attributes. At step 320, the user is presented with an opportunity to add an audible memorandum to the call interaction record. If the user does not choose to add such a memorandum, the process skips to step 324. If the user does choose to add such a memorandum, the process proceeds to step 322, the memorandum is recorded and added to the call interaction record.

At step 324, the call interaction record is closed and stored. At step 326, the call interaction record is retrieved and analyzed as desired to provide billing information and to provide statistical information relating to call costs and revenue.

Figure 4:
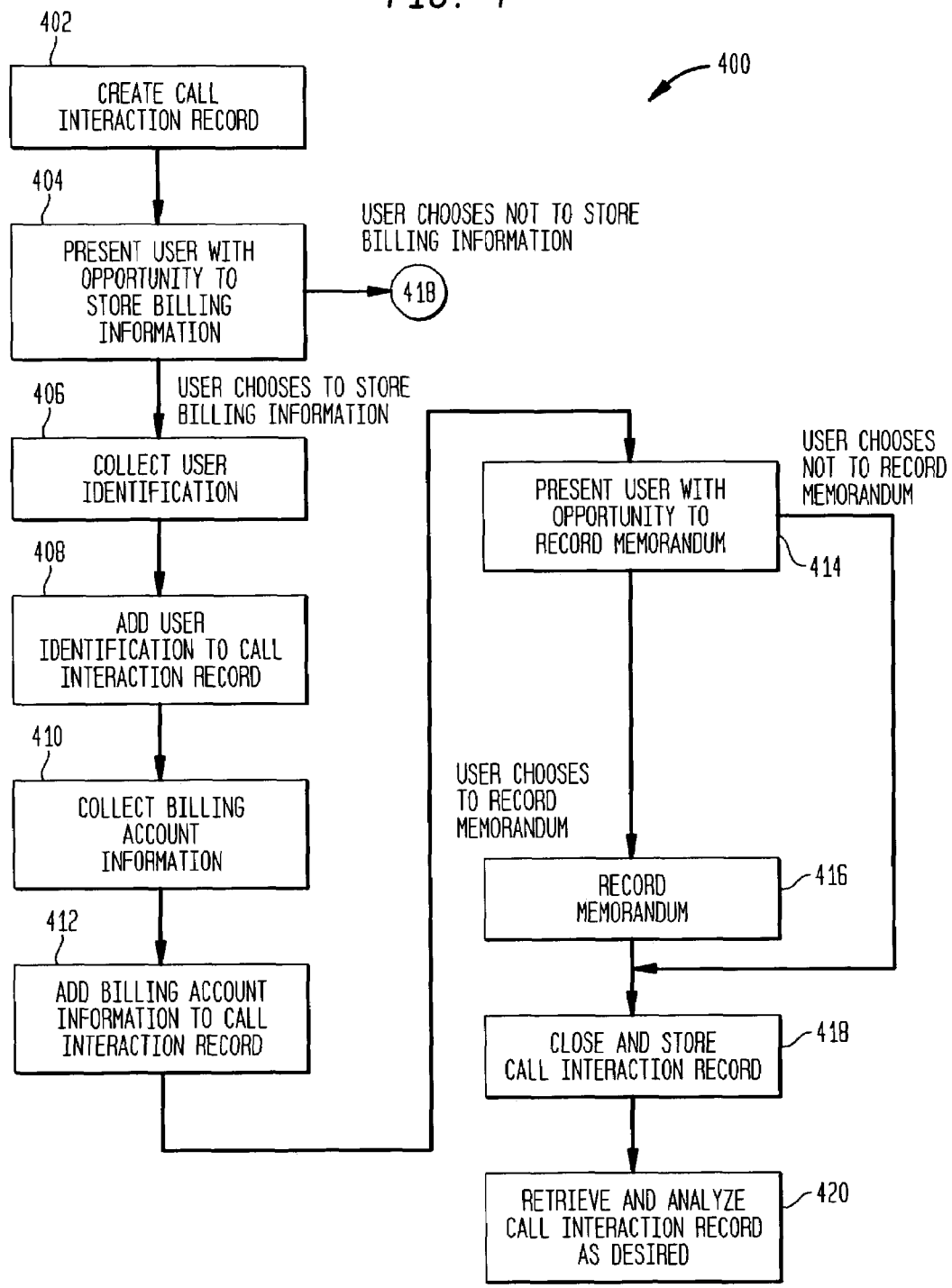
FIG. 4 illustrates a process of call information collection for an incoming call according to an aspect of the present invention.

FIG. 4 illustrates the steps of a process 400 of call management and billing for outgoing calls according to an aspect of the present invention. The process 400 may suitably be performed using a system similar to the system 100 of FIG. 1. At step 402, upon connection of an incoming call, a call interaction record is created with a unique call identifier assigned to the call interaction record. Additional information relevant to the call is added to the call interaction record. Such information suitably includes the start time of the call and extension to which the call was connected, as well as the originating telephone number, if this can be determined. At step 404, upon completion of the call, the user to whom the call was routed is presented with an option to store billing information relevant to the call. Such an option may suitably be presented by playing an audible query for the user and awaiting the user's response, or by awaiting some other indication from the user, such as a keypad entry. If the user chooses not to store billing information, the process skips to step 418. If the user chooses to store billing information, the process proceeds to step 406.

At step 406, user identification information is collected from the user, suitably by presenting the user with a query requesting the information, receiving responses from the user that may include voice responses matching the responses to a stored user identifier, using natural language speech recognition to interpret any voice responses. At step 408, the user identification is added to the call interaction record. At step 410, billing account information is collected from the user, suitably by presenting the user with an appropriate query, receiving responses from the user that may include voice responses and matching the responses to a stored billing account identifier, using natural language voice recognition to interpret the voice responses, or recording a voice response for later use in determining the appropriate billing account if matching is not possible.

At step 412, the collected billing account information is added to the call interaction record. At step 414, the user is given an opportunity to record an audible memorandum to be added to the call interaction record. If the user does not choose to add a memorandum to the call interaction record, the process skips to step 418. If the user chooses to add such a memorandum to the call interaction record, the process proceeds to step 416 and the memorandum is recorded and added to the call interaction record. The process then proceeds to step 418.

At step 418, the call interaction record is closed and stored. At step 420, the call interaction record is retrieved and analyzed as desired to provide billing information and to provide statistical information relating to call costs and revenue.

While the present invention is disclosed in the context of a presently preferred embodiment, it will be recognized that a wide variety of implementations may be employed by persons of ordinary skill in the art consistent with the above discussion and the claims which follow below.

We claim:

1. A call routing and data collection and management system for collecting, maintaining and analyzing information relating to revenue generating calls, comprising:
    a central exchange for originating and connecting calls;
    a data management module for assembling a call interaction record for each call identified as a revenue generating call, each call interaction record including a unique call identifier and call accounting information for the call, the data management module being operative to receive information identifying a call as a billable call generating revenue based on services rendered by a user engaged in the call, the data management module being further operative to collect information relating to the nature of a billable call in order to facilitate proper identification of the call for billing for services represented by the call; and
    a voice recognition module operating under the direction of the data management module for presenting voice queries to a user for collection of call accounting information and receiving voice responses to the queries, the voice recognition module being operative to interpret the voice responses to identify stored call accounting information matching the responses and to relay the identified call accounting information to the data management module for storage in a call interaction record.

2. The system of claim 1, wherein the call accounting information includes a user identifier and a billing account identifier.

3. The system of claim 2, wherein the voice recognition module is operative to compare voice characteristics of a received voice response to a voice match directory in order determine that the user providing the voice response is the user whose user identification was provided.

4. The system of claim 3, wherein the voice recognition module is operative to determine whether call accounting information provided in an initial voice response can be unambiguously matched to stored call accounting information and to provide additional clarifying queries if the information in the initial voice response cannot be unambiguously matched to the stored information.

5. The system of claim 4, wherein one or more of the clarifying queries may take the form of a recitation of a list of possible candidates for matching to the initial voice response and a request to select a candidate matching the desired information.

6. The system of claim 5, wherein the voice recognition module is operative to present a list of candidates only if the initial voice response matches more than one candidate but less than a predetermined number of candidates.

7. The system of claim 6, wherein the voice recognition module is operative to recognize if a voice response cannot be matched to stored information with sufficient precision and upon such recognition to request a voice response presenting call accounting information and to record the response given as an audible file includible in the call interaction record in order to allow a human operator to replay the file in order to identify the call accounting information provided.

8. The system of claim 7, further comprising a call analytics module for collecting the call accounting information, the call analytics module interacting with the voice recognition module for collecting the call accounting information and relaying the call accounting information to the data management module.

9. The system of claim 8, further comprising a routing module for collecting call destination information for the call, the routing module interacting with the voice recognition module for collecting the call destination information and relaying the call destination information to the data management module, and wherein the data management module is operative to store the call destination information in the call interaction record.

10. The system of claim 9, wherein the central exchange collects initial call information at the start of a call and relays the initial call information to the data management module for storage in the call interaction record.

11. The system of claim 10, wherein the central exchange is operative to distinguish a revenue generating call from a non revenue generating call based on a selection made by a user in originating the call and wherein the data management module does not collect call accounting information for a non revenue generating call.

12. The system of claim 11, wherein the data management module 109 is also operative to assemble a call interaction record for each incoming call and to collect call accounting information from a user who has received an incoming call upon termination of the call.

13. The system of claim 12, wherein the data management module 109 presents the user with an opportunity to record a memorandum at the conclusion of a call and, if the user selects to record a memorandum, invokes the voice recognition module to record a sound file, the sound file being stored in the call interaction record.

14. The system of claim 13, further including a billing and analysis module for reviewing information stored in call interaction records to collect information for account billing and for analysis to determine costs, revenue generation and profitability of calls.

15. A method of collecting, storing and analyzing information relating to revenue generating calls, comprising:
    creating a call interaction record upon initiation of each call, the call interaction record including a unique call identifier;
    collecting call accounting information from a user by presenting queries to the user and receiving and interpreting voice responses from the user, the voice responses being matched to stored call accounting information, collection of call accounting information including collecting information indicating whether a call is a billable call generating revenue based on billable services rendered by a user engaged in the call and, if the call is a billable call, collecting information relating to the nature of the call in order to accurately identify and bill for the services represented by a call; and upon matching a voice response to stored information, including the information matching the voice response in the call interaction record.

16. The method of claim 15, wherein the call accounting information includes user and billing account identification.

17. The method of claim 16, wherein the step of collecting call accounting information includes receiving an initial response to a query and presenting one or more clarifying queries if the initial response cannot be unambiguously matched to stored information.

18. The method of claim 17, wherein one or more of the clarifying queries takes the form of a recitation of a list of possible candidates for matching to the initial voice response and a request to select a candidate matching the desired information.

19. The method of claim 18, wherein a list of candidates is presented only if the initial voice response matches more than one candidate but less than a predetermined number of candidates.

20. The method of claim 19, further including a step of recognizing that a clarifying query has not elicited a voice response unambiguously matching stored information, and, upon such recognition, requesting a voice response presenting call accounting information, recording the response as an audible file includible in the call interaction record in order to allow a human operator to replay the file in order to identify the call accounting information provided.

21. The method of claim 20, further including a step of presenting an option to a user to record an audible memorandum upon termination of a call and, upon a user selection to record a memorandum, recording a voice response from the user as a sound file and storing the recorded sound file in the call interaction record.

* * * * *